UNITED STATES PATENT OFFICE.

HERMANN BAUERMEISTER, OF BRUNSWICK, GERMANY.

METHOD OF PREPARING DENTAL REMEDIES.

SPECIFICATION forming part of Letters Patent No. 660,943, dated October 30, 1900.

Application filed March 13, 1900. Serial No. 8,536. (No specimens.)

*To all whom it may concern:*

Be it known that I, HERMANN BAUERMEISTER, dentist, a subject of the Emperor of Germany, residing at Brunswick, Duchy of Brunswick, in the Empire of Germany, have invented certain new and useful Improvements in Methods of Producing a Substance for the Treatment of Cauterized Pulp-Stumps, of which the following is a specification.

It has heretofore been proposed to treat the pulp-stumps of teeth corroded by caries with astringent salts—such as borax, alum, or the like—after the stumps have been cauterized and before filling the teeth instead of removing the stumps or treating them with an antiseptic, such as formaldehyde or the like, such treatment having for its object to preserve the stumps by preventing decomposition. To this end a small quantity of the salt (borax) is inserted in the pulp-cavity or rubbed on the pulp-stumps. Also crystalline borax has been mixed with other materials, such as acid of cloves, and inserted in the pulp-cavity. Such treatment has the disadvantage that the consumption of the astringent salt is so rapid as to prevent subsequent decomposition of the pulp. Besides, this process is more tedious than that practiced according to the invention disclosed herein.

According to my said invention, therefore, I employ for the astringent salt a suitable carrier, consisting of a porous substance, as asbestos or fossil-meal, which is impregnated with a solution of the said salt. I then let the salt crystallize in the carrier and remove therefrom more or less of the water of crystallization by means of heat, whereby the salt is transformed into a form which is hard to dissolve and which will firmly adhere to the porous body. If now a piece of the substance so prepared is placed upon the tooth-pulp, the supply of astringent salt will be sufficient to prevent decomposition of the tooth-pulp by reason of the fact that it will dissolve very slowly. If desired, other antiseptics may be added to increase the effect produced by the salt. To this end the preparation produced by the method described is impregnated with an essential oil, whereby the advantage is gained that the astringent salt will dissolve more slowly by reason of being inclosed, so to speak, in the essential oil, while the preparation will still exercise its antiseptic properties.

What I claim as my invention is—

The method of producing a durable substance for the treatment of cauterized pulp-stumps, consisting in impregnating asbestos with a solution of an astringent salt, allowing the salt to crystallize and removing the water of crystallization by means of heat, and then further impregnating said substance with an antiseptic in the form of an essential oil, substantially as described.

In testimony whereof I have hereunto set my hand in presence of two subscribing witnesses.

HERMANN BAUERMEISTER.

Witnesses:
WILHELM LEHRKE,
JULIUS SECKEL.